US008385672B2

(12) United States Patent
Giuffrida et al.

(10) Patent No.: US 8,385,672 B2
(45) Date of Patent: Feb. 26, 2013

(54) SYSTEM FOR DETECTING IMAGE ABNORMALITIES

(75) Inventors: Frank Giuffrida, Honeoye Falls, NY (US); Stephen Schultz, West Henrietta, NY (US)

(73) Assignee: Pictometry International Corp., Rochester, NY (US)

( * ) Notice: Subject to any disclaimer, the term of this patent is extended or adjusted under 35 U.S.C. 154(b) by 1274 days.

(21) Appl. No.: 12/112,837

(22) Filed: Apr. 30, 2008

(65) Prior Publication Data

US 2008/0273753 A1 Nov. 6, 2008

Related U.S. Application Data

(60) Provisional application No. 60/926,985, filed on May 1, 2007.

(51) Int. Cl.
*G06K 9/40* (2006.01)
(52) U.S. Cl. .......................................... 382/254; 382/109
(58) Field of Classification Search ........... 382/100–322
See application file for complete search history.

(56) References Cited

U.S. PATENT DOCUMENTS

| 2,273,876 | A |   | 2/1942  | Lutz et al.            |
|-----------|---|---|---------|------------------------|
| 2,944,151 | A | * | 7/1960  | Whitney et al. ... 250/347 |
| 2,979,832 | A | * | 4/1961  | Klemperer ......... 434/43 |
| 3,153,784 | A |   | 10/1964 | Petrides et al.        |
| 3,594,556 | A |   | 7/1971  | Edwards                |
| 3,614,410 | A |   | 10/1971 | Bailey                 |
| 3,621,326 | A |   | 11/1971 | Hobrough               |
| 3,661,061 | A |   | 5/1972  | Tokarz                 |
| 3,699,245 | A | * | 10/1972 | Scott ............ 348/209.99 |
| 3,716,669 | A |   | 2/1973  | Watanabe et al.        |
| 3,725,563 | A |   | 4/1973  | Woycechowsky           |
| 3,864,513 | A |   | 2/1975  | Halajian et al.        |
| 3,866,602 | A |   | 2/1975  | Furihata               |
| 3,877,799 | A |   | 4/1975  | O'Donnell              |
| 3,917,199 | A | * | 11/1975 | Dewitt ............ 396/13 |
| 4,015,080 | A |   | 3/1977  | Moore-Searson          |
| 4,044,879 | A |   | 8/1977  | Stahl                  |
| 4,184,711 | A |   | 1/1980  | Wakimoto               |

(Continued)

FOREIGN PATENT DOCUMENTS

| AT | 331204 T | 7/2006 |
|----|----------|--------|
| AU | 9783798  | 4/1999 |

(Continued)

OTHER PUBLICATIONS

European 08754985.3 Supplementary European Search Report dated Jul. 5, 2012.

(Continued)

*Primary Examiner* — Manav Seth
(74) *Attorney, Agent, or Firm* — Dunlap Codding, P.C.

(57) ABSTRACT

An image capture system for capturing images of an object, the image capture system comprising a moving platform such as an airplane, one or more image capture devices mounted to the moving platform, and a detection computer. The image capture device has a sensor for capturing an image. The detection computer executes an abnormality detection algorithm for detecting an abnormality in an image immediately after the image is captured and then automatically and immediately causing a re-shoot of the image. Alternatively, the detection computer sends a signal to the flight management software executed on a computer system to automatically schedule a re-shoot of the image. When the moving platform is an airplane, the detection computer schedules a re-shoot of the image such that the image is retaken before landing the airplane.

2 Claims, 10 Drawing Sheets

U.S. PATENT DOCUMENTS

| | | | |
|---|---|---|---|
| 4,240,108 A | 12/1980 | Levy | |
| 4,281,354 A | 7/1981 | Conte | |
| 4,344,146 A * | 8/1982 | Davis et al. | 382/141 |
| 4,344,683 A | 8/1982 | Stemme | |
| 4,360,876 A | 11/1982 | Girault et al. | |
| 4,382,678 A | 5/1983 | Thompson et al. | |
| 4,387,056 A | 6/1983 | Stowe | |
| 4,396,942 A | 8/1983 | Gates | |
| 4,463,380 A | 7/1984 | Hooks | |
| 4,489,322 A | 12/1984 | Zulch et al. | |
| 4,489,389 A * | 12/1984 | Beckwith et al. | 345/421 |
| 4,490,742 A | 12/1984 | Wurtzinger | |
| 4,491,399 A | 1/1985 | Bell | |
| 4,495,500 A | 1/1985 | Vickers | |
| 4,527,055 A | 7/1985 | Harkless et al. | |
| 4,543,603 A | 9/1985 | Laures | |
| 4,586,138 A | 4/1986 | Mullenhoff et al. | |
| 4,635,136 A | 1/1987 | Ciampa et al. | |
| 4,653,136 A | 3/1987 | Denison | |
| 4,653,316 A | 3/1987 | Fukuhara | |
| 4,673,988 A | 6/1987 | Jansson et al. | |
| 4,685,143 A * | 8/1987 | Choate | 382/170 |
| 4,686,474 A | 8/1987 | Olsen et al. | |
| 4,688,092 A | 8/1987 | Kamel et al. | |
| 4,689,748 A | 8/1987 | Hofmann | |
| 4,707,698 A | 11/1987 | Constant et al. | |
| 4,758,850 A | 7/1988 | Archdale et al. | |
| 4,805,033 A | 2/1989 | Nishikawa | |
| 4,807,024 A | 2/1989 | Mclaurin et al. | |
| 4,814,711 A | 3/1989 | Olsen et al. | |
| 4,814,896 A | 3/1989 | Heitzman et al. | |
| 4,843,463 A | 6/1989 | Michetti | |
| 4,899,296 A | 2/1990 | Khattak | |
| 4,906,198 A | 3/1990 | Cosimano et al. | |
| 4,953,227 A | 8/1990 | Katsuma et al. | |
| 4,956,872 A | 9/1990 | Kimura | |
| 5,034,812 A | 7/1991 | Rawlings | |
| 5,072,396 A * | 12/1991 | Fitzpatrick et al. | 701/409 |
| 5,086,314 A | 2/1992 | Aoki et al. | |
| 5,121,222 A | 6/1992 | Endoh et al. | |
| 5,124,913 A * | 6/1992 | Sezan et al. | 382/132 |
| 5,136,297 A * | 8/1992 | Lux et al. | 342/64 |
| 5,138,444 A | 8/1992 | Hiramatsu | |
| 5,155,597 A | 10/1992 | Lareau et al. | |
| 5,164,825 A | 11/1992 | Kobayashi et al. | |
| 5,166,789 A | 11/1992 | Myrick | |
| 5,191,174 A | 3/1993 | Chang et al. | |
| 5,200,793 A | 4/1993 | Ulich et al. | |
| 5,210,586 A | 5/1993 | Grage et al. | |
| 5,231,435 A | 7/1993 | Blakely | |
| 5,247,356 A | 9/1993 | Ciampa | |
| 5,251,037 A | 10/1993 | Busenberg | |
| 5,265,173 A | 11/1993 | Griffin et al. | |
| 5,267,042 A | 11/1993 | Tsuchiya et al. | |
| 5,270,756 A | 12/1993 | Busenberg | |
| 5,296,884 A | 3/1994 | Honda et al. | |
| 5,335,072 A | 8/1994 | Tanaka et al. | |
| 5,342,999 A | 8/1994 | Frei et al. | |
| 5,345,086 A | 9/1994 | Bertram | |
| 5,353,055 A | 10/1994 | Hiramatsu | |
| 5,369,443 A | 11/1994 | Woodham | |
| 5,381,338 A * | 1/1995 | Wysocki et al. | 701/409 |
| 5,402,170 A | 3/1995 | Parulski et al. | |
| 5,414,462 A | 5/1995 | Veatch | |
| 5,426,476 A * | 6/1995 | Fussell et al. | 396/12 |
| 5,467,271 A | 11/1995 | Abel et al. | |
| 5,481,479 A | 1/1996 | Wight et al. | |
| 5,486,948 A | 1/1996 | Imai et al. | |
| 5,506,644 A | 4/1996 | Suzuki et al. | |
| 5,508,736 A | 4/1996 | Cooper | |
| 5,555,018 A | 9/1996 | von Braun | |
| 5,586,204 A * | 12/1996 | Noble et al. | 382/282 |
| 5,596,494 A * | 1/1997 | Kuo | 702/2 |
| 5,604,534 A | 2/1997 | Hedges et al. | |
| 5,613,013 A * | 3/1997 | Schuette | 382/124 |
| 5,617,224 A | 4/1997 | Ichikawa et al. | |
| 5,633,946 A | 5/1997 | Lachinski et al. | |
| 5,654,890 A * | 8/1997 | Nicosia et al. | 701/16 |
| 5,668,593 A | 9/1997 | Lareau et al. | |
| 5,677,515 A | 10/1997 | Selk et al. | |
| 5,798,786 A | 8/1998 | Lareau et al. | |
| 5,835,133 A | 11/1998 | Moreton et al. | |
| 5,841,574 A | 11/1998 | Willey | |
| 5,844,602 A | 12/1998 | Lareau et al. | |
| 5,852,753 A | 12/1998 | Lo et al. | |
| 5,894,323 A | 4/1999 | Kain et al. | |
| 5,899,945 A | 5/1999 | Baylocq et al. | |
| 5,963,664 A | 10/1999 | Kumar et al. | |
| 6,088,055 A | 7/2000 | Lareau et al. | |
| 6,091,448 A | 7/2000 | Washisu et al. | |
| 6,094,215 A | 7/2000 | Sundahl et al. | |
| 6,097,854 A | 8/2000 | Szeliski et al. | |
| 6,108,032 A * | 8/2000 | Hoagland | 348/144 |
| 6,130,705 A | 10/2000 | Lareau et al. | |
| 6,157,747 A | 12/2000 | Szeliski et al. | |
| 6,167,300 A | 12/2000 | Cherepenin et al. | |
| 6,222,538 B1 | 4/2001 | Anderson | |
| 6,222,583 B1 | 4/2001 | Matsumura et al. | |
| 6,236,886 B1 | 5/2001 | Cherepenin et al. | |
| 6,256,057 B1 | 7/2001 | Mathews et al. | |
| 6,373,522 B2 | 4/2002 | Mathews et al. | |
| 6,421,610 B1 | 7/2002 | Carroll et al. | |
| 6,434,280 B1 | 8/2002 | Peleg et al. | |
| 6,597,818 B2 | 7/2003 | Kumar et al. | |
| 6,639,596 B1 | 10/2003 | Shum et al. | |
| 6,711,475 B2 | 3/2004 | Murphy | |
| 6,731,329 B1 | 5/2004 | Feist et al. | |
| 6,747,686 B1 | 6/2004 | Bennett | |
| 6,809,763 B1 | 10/2004 | Yoshida | |
| 6,834,128 B1 | 12/2004 | Altunbasak et al. | |
| 6,876,763 B2 | 4/2005 | Sorek et al. | |
| 6,961,445 B1 * | 11/2005 | Jensen et al. | 382/103 |
| 7,006,678 B2 * | 2/2006 | Sawada | 382/132 |
| 7,009,638 B2 | 3/2006 | Gruber et al. | |
| 7,018,050 B2 | 3/2006 | Ulichney et al. | |
| 7,046,401 B2 | 5/2006 | Dufaux et al. | |
| 7,061,650 B2 | 6/2006 | Walmsley et al. | |
| 7,065,260 B2 | 6/2006 | Zhang et al. | |
| 7,113,202 B2 * | 9/2006 | Konya | 348/117 |
| 7,123,382 B2 | 10/2006 | Walmsley et al. | |
| 7,127,107 B2 * | 10/2006 | Kubota et al. | 382/199 |
| 7,127,348 B2 | 10/2006 | Smitherman et al. | |
| 7,142,984 B2 | 11/2006 | Rahmes et al. | |
| 7,181,074 B2 * | 2/2007 | Okada et al. | 382/240 |
| 7,230,221 B2 * | 6/2007 | Busse et al. | 250/203.6 |
| 7,233,691 B2 | 6/2007 | Setterholm | |
| 7,262,790 B2 | 8/2007 | Bakewell | |
| 7,298,876 B1 * | 11/2007 | Marshall et al. | 382/128 |
| 7,348,895 B2 | 3/2008 | Lagassey | |
| 7,379,091 B2 | 5/2008 | Yost et al. | |
| 7,383,504 B1 * | 6/2008 | Divakaran et al. | 715/723 |
| 7,508,423 B2 * | 3/2009 | Ohmori et al. | 348/230.1 |
| 7,590,284 B2 * | 9/2009 | Kakiuchi et al. | 382/167 |
| 7,659,906 B2 * | 2/2010 | LinneVonBerg et al. | 345/536 |
| 7,702,461 B2 * | 4/2010 | Conner et al. | 701/301 |
| RE41,447 E * | 7/2010 | Tiana | 382/274 |
| 7,826,666 B2 * | 11/2010 | Hamza et al. | 382/218 |
| 7,876,925 B2 * | 1/2011 | Hamza | 382/103 |
| 2002/0041328 A1 | 4/2002 | LeCompte et al. | |
| 2002/0041717 A1 | 4/2002 | Murata et al. | |
| 2002/0114536 A1 | 8/2002 | Xiong et al. | |
| 2003/0014224 A1 | 1/2003 | Guo et al. | |
| 2003/0043824 A1 | 3/2003 | Remboski et al. | |
| 2003/0088362 A1 | 5/2003 | Melero et al. | |
| 2003/0151674 A1 | 8/2003 | Lin | |
| 2003/0179942 A1 | 9/2003 | Okada | |
| 2003/0193602 A1 | 10/2003 | Satoh et al. | |
| 2003/0214585 A1 | 11/2003 | Bakewell | |
| 2004/0105090 A1 | 6/2004 | Schultz et al. | |
| 2004/0167709 A1 | 8/2004 | Smitherman et al. | |
| 2004/0189837 A1 | 9/2004 | Kido | |
| 2004/0196503 A1 | 10/2004 | Kurtenbach et al. | |
| 2004/0263628 A1 | 12/2004 | Ambiru et al. | |
| 2005/0073241 A1 | 4/2005 | Yamauchi et al. | |
| 2005/0088251 A1 | 4/2005 | Matsumoto | |
| 2005/0094004 A1 | 5/2005 | Gotanda | |
| 2005/0117031 A1 | 6/2005 | Russon et al. |

| | | | |
|---|---|---|---|
| 2005/0169521 | A1 | 8/2005 | Hel-Or |
| 2006/0028550 | A1 | 2/2006 | Palmer et al. |
| 2006/0092043 | A1 | 5/2006 | Lagassey |
| 2006/0152606 | A1 | 7/2006 | Noguchi |
| 2006/0171567 | A1* | 8/2006 | Osher et al. ............... 382/106 |
| 2006/0238383 | A1 | 10/2006 | Kimchi et al. |
| 2006/0250515 | A1 | 11/2006 | Koseki et al. |
| 2007/0024612 | A1 | 2/2007 | Balfour |
| 2007/0046448 | A1 | 3/2007 | Smitherman |
| 2007/0237420 | A1 | 10/2007 | Steedly et al. |
| 2008/0120031 | A1 | 5/2008 | Rosenfeld et al. |
| 2008/0123994 | A1 | 5/2008 | Schultz et al. |
| 2009/0067725 | A1* | 3/2009 | Sasakawa et al. ........ 382/190 |
| 2009/0190847 | A1* | 7/2009 | Marks ..................... 382/239 |

FOREIGN PATENT DOCUMENTS

| | | |
|---|---|---|
| AU | 3874400 | 9/2000 |
| AU | 03/291364 | 6/2004 |
| BR | 0316110 | 9/2005 |
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1180967 | 2/2002 |
| EP | 1418402 | 5/2004 |
| EP | 1696204 | 8/2006 |
| ES | 2266704 T | 3/2007 |
| HK | 1088421 A | 11/2006 |
| JP | 2003/317089 A | 11/2003 |
| JP | 2006505794 T | 2/2006 |
| MX | PA05004987 | 2/2006 |
| SG | 2005/03341 | 5/2007 |
| WO | WO99/18732 | 4/1999 |
| WO | WO/00/53090 | 9/2000 |
| WO | WO/2004/044692 | 5/2004 |
| WO | WO/2005/088251 | 9/2005 |
| WO | WO/2008/028040 | 3/2008 |

OTHER PUBLICATIONS

Mostafa M et al, Airborn Remote Sensing Without Ground Control, IGARSS 2001, IEEE 2001 International Geoscience and Remote Sensing Symposium, Sydney, Australia, Jul. 9-13, 2001, vol. 7, Jul. 9, 2001, pp. 2961-2963.

Hogue, United States Patent and Trademark Office Final Office Action dated Mar. 16, 2009 for U.S. Appl. No. 11/031,505, 28 pgs.

Jin, Resubmitted Amendment for U.S. Appl. No. 11/031,505, Dec. 24, 2009, 17 pgs.

Ackermann, Prospects of Kinematic GPS Aerial Triangulation, ITC Journal, 1992.

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava 27.—Jan. 30, 2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

Graham, Horita TRG-50 SMPTE Time-Code Reader, Generator, Window Inserter, 1990.

Hess, L.L., et al., "Geocoded Digital Videography for Validation of Land Cover Mapping in the Amazon Basin", International Journal of Remote Sensing, vol. 23, No. 7, pp. 1527-1555, 2002.

Hinthorne, J., et al., "Image Processing in the Grass GIS", Geoscience and Remote Sensing Symposium, 4:2227-2229, 1991.

Imhof, Ralph K., "Mapping from Oblique Photographs", Manual of Photogrammetry, Chapter 18, Jan. 2007.

Jensen, John R., Introductory Digital Image Processing: A Remote Sensing Perspective, Prentice-Hall, 1986; 399 pages.

Lapine, Lewis A., "Practical Photogrammetric Control by Kinematic GPS", GPS World, 1(3):44-49, 1990.

Lapine, Lewis A., Airborne Kinematic GPS Positioning for Photogrammetry—The Determination of the Camera Exposure Station, Silver Spring, MD, 11 pages, at least as early as 2000.

Linden et al., Airborne Video Automated Processing, US Forest Service Internal report, Fort Collins, CO, 1993.

Myhre, Dick, "Airborne Video System Users Guide", USDA Forest Service, Forest Pest Management Applications Group, published by Management Assistance Corporation of America, 6 pages, 1992.

Myhre et al., "An Airborne Video System Developed Within Forest Pest Management—Status and Activities", 10 pages, 1992.

Myhre et al., "Airborne Videography—A Potential Tool for Resource Managers"—Proceedings: Resource Technology 90, 2nd International Symposium on Advanced Technology in Natural Resource Management, 5 pages, 1990.

Myhre et al., Aerial Photography for Forest Pest Management, Proceedings of Second Forest Service Remote Sensing Applications Conference, Slidell, Louisiana, 153-162, 1988.

Myhre et al., "Airborne Video Technology", Forest Pest Management/Methods Application Group, Fort Collins, CO, pp. 1-6, at least as early as Jul. 30, 2006.

Norton-Griffiths et al., 1982. "Sample surveys from light aircraft combining visual observations and very large scale color photography". University of Arizona Remote Sensing Newsletter 82-2:1-4.

Norton-Griffiths et al., "Aerial Point Sampling for Land Use Surveys", Journal of Biogeography, 15:149-156, 1988.

Novak, Rectification of Digital Imagery, Photogrammetric Engineering and Remote Sensing, 339-344, 1992.

Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.

Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.

Slaymaker, et al., "Cost-effective Determination of Biomass from Aerial Images", Lecture Notes in Computer Science, 1737:67-76, http://portal.acm.org/citation.cfm?id=648004.743267&coll=GUIDE&dl=, 1999.

Slaymaker, et al., "A System for Real-time Generation of Geo-referenced Terrain Models", 4232A-08, SPIE Enabling Technologies for Law Enforcement Boston, MA, ftp://vis-ftp.cs.umass.edu/Papers/schultz/spie2000.pdf, 2000.

Slaymaker, et al., "Integrating Small Format Aerial Photography, Videography, and a Laser Profiler for Environmental Monitoring", in ISPRS WG III/1 Workshop on Integrated Sensor Calibration and Orientation, Portland, Maine, 1999.

Slaymaker, et al., "Calculating Forest Biomass With Small Format Aerial Photography, Videography and a Profiling Laser", In Proceedings of the 17th Biennial Workshop on Color Photography and Videography in Resource Assessment, Reno, NV, 1999.

Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.

Star et al., "Geographic Information Systems an Introduction", Prentice-Hall, 1990.

Tomasi et al., "Shape and Motion from Image Streams: a Factorization Method"—Full Report on the Orthographic Case, pp. 9795-9802, 1992.

Warren, Fire Mapping with the Fire Mousetrap, Aviation and Fire Management, Advanced Electronics System Development Group, USDA Forest Service, 1986.

Welch, R., "Desktop Mapping with Personal Computers", Photogrammetric Engineering and Remote Sensing, 1651-1662, 1989.

Westervelt, James, "Introduction to GRASS 4", pp. 1-25, 1991.

"RGB Spectrum Videographics Report, vol. 4, No. 1, McDonnell Douglas Integrates RGB Spectrum Systems in Helicopter Simulators", pp. 1-6, 1995.

RGB "Computer Wall", RGB Spectrum, 4 pages, 1995.

"The First Scan Converter with Digital Video Output", Introducing . . . The RGBN/Videolink 1700D-1, RGB Spectrum, 2 pages, 1995.

ERDAS Field Guide, Version 7.4, A Manual for a commercial image processing system, 1990.

"Image Measurement and Aerial Photography", Magazine for all branches of Photogrammetry and its fringe areas, Organ of the German Photogrammetry Association, Berlin-Wilmersdorf, No. 1, 1958.

"Airvideo Analysis", MicroImages, Inc., Lincoln, NE, 1 page, Dec. 1992.

Zhu, Zhigang, Hanson, Allen R., "Mosaic-Based 3D Scene Representation and Rendering", Image Processing, 2005, ICIP 2005, IEEE International Conference on 1(2005).

Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.

"POS AV" georeferenced by APPLANIX aided inertial technology, http://www.applanix.com/products/posav_index.php, Prior to May 2007.

Mostafa, et al., "Ground Accuracy from Directly Georeferenced Imagery", Published in GIM International vol. 14 N. 12 Dec. 2000.

Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.

Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.

Mostafa, et al., "Airborne DGPS Without Dedicated Base Stations for Mapping Applications", Proceedings of ION-GPS 2001, Salt Lake City, Utah, USA, Sep. 11-14.

Mostafa, "ISAT Direct Exterior Orientation QA/QC Strategy Using POS Data", Proceedings of OEEPE Workshop: Integrated Sensor Orientation, Hanover, Germany, Sep. 17-18, 2001.

Mostafa, "Camera/IMU Boresight Calibration: New Advances and Performance Analysis", Proceedings of the ASPRS Annual Meeting, Washington, D.C., Apr. 21-26, 2002.

Hiatt, "Sensor Integration Aids Mapping at Ground Zero", Photogrammetric Engineering and Remote Sensing, Sep. 2002, p. 877-878.

Mostafa, "Precision Aircraft GPS Positioning Using CORS", Photogrammetric Engineering and Remote Sensing, Nov. 2002, p. 1125-1126.

Mostafa, et al., System Performance Analysis of INS/DGPS Integrated System for Mobile Mapping System (MMS), Department of Geomatics Engineering, University of Calgary, Commission VI, WG VI/4, 2004.

Artes F., & Hutton, J., "GPS and Inertial Navigation Delivering", Sep. 2005, GEOconnexion International Magazine, p. 52-53.

"POS AV" APPLANIX, Product Outline, airborne@applanix.com, 3 pages.

POSTrack, "Factsheet", APPLANIX, Ontario, Canada, www.applanix.com, Prior to Feb. 28, 2007.

POS AV "Digital Frame Camera Applications", 3001 Inc., Brochure, 2007.

POS AV "Digital Scanner Applications", Earthdata Brochure, Prior to Feb. 28, 2007.

POS AV "Film Camera Applications" AeroMap Brochure, Prior to Feb. 28, 2007.

POS AV "LIDAR Applications" MD Atlantic Brochure, Prior to Feb. 28, 2007.

POS AV "OEM System Specifications", 2005.

POS AV "Synthetic Aperture Radar Applications", Overview, Orbisat Brochure, Prior to Feb. 28, 2007.

"POSTrack V5 Specifications" 2005.

"Remote Sensing for Resource Inventory Planning and Monitoring", Proceeding of the Second Forest Service Remote Sensing Applications Conference—Slidell, Louisiana and NSTL, Mississippi, Apr. 11-15, 1988.

"Protecting Natural Resources with Remote Sensing", Proceeding of the Third Forest Service Remote Sensing Applications Conference—Apr. 9-13, 1990.

Heipke, et al, "Test Goals and Test Set Up for the OEEPE Test—Integrated Sensor Orientation", 1999.

Kumar, et al., "Registration of Video to Georeferenced Imagery", Sarnoff Corporation, CN5300, Princeton, NJ, 1998.

McConnel, Proceedings Aerial Pest Detection and Monitoring Workshop—1994.pdf, USDA Forest Service Forest Pest Management, Northern Region, Intermountain regiion, Forest Insects and Diseases, Pacific Northwest Region.

"Standards for Digital Orthophotos", National Mapping Program Technical Instructions, US Department of the Interior, Dec. 1996.

Tao, "Mobile Mapping Technology for Road Network Data Acquisition", Journal of Geospatial Engineering, vol. 2, No. 2, pp. 1-13, 2000.

"Mobile Mapping Systems Lesson 4", Lesson 4 SURE 382 Geographic Information Systems II, pp. 1-29, Jul. 2, 2006.

Konecny, G., "Mechanische Radialtriangulation mit Konvergentaufnahmen", Bildmessung und Luftbildwesen, 1958, Nr. 1.

Myhre, "ASPRS/ACSM/RT 92" Technical papers, Washington, D.C., vol. 5 Resource Technology 92, Aug. 3-8, 1992.

Rattigan, "Towns get new view from above," *The Boston Globe*, Sep. 5, 2002.

Mostafa, et al., "Digital image georeferencing from a multiple camera system by GPS/INS," *ISP RS Journal of Photogrammetry & Remote Sensing*, 56(I): I-12, Jun. 2001.

Dillow, "Grin, or bare it, for aerial shot," *Orange County Register* (California), Feb. 25, 2001.

Anonymous, "Live automatic coordinates for aerial images," *Advanced Imaging*, 12(6):51, Jun. 1997.

Anonymous, "Pictometry and US Geological Survey announce—Cooperative Research and Development Agreement," Press Release published Oct. 20, 1999.

Miller, "Digital software gives small Arlington the Big Picture," *Government Computer News State & Local*, 7(12), Dec. 2001.

Garrett, "Pictometry: Aerial photography on steroids," *Law Enforcement Technology* 29(7):114-116, Jul. 2002.

Weaver, "County gets an eyeful," *The Post-Standard* (Syracuse, NY), May 18, 2002.

Reed, "Firm gets latitude to map O.C. in 3D," *Orange County Register* (California), Sep. 27, 2000.

Reyes, "Orange County freezes ambitious aerial photography project," *Los Angeles Times*, Oct. 16, 2000.

* cited by examiner

SYSTEM FOR DETECTING IMAGE ABNORMALITIES

CROSS-REFERENCE TO RELATED APPLICATIONS

The present patent application claims priority to the provisional patent application identified by U.S. Ser. No. 60/926,985, filed on May 1, 2007, the entire content of which is hereby incorporated herein by reference.

STATEMENT REGARDING FEDERALLY SPONSORED RESEARCH AND DEVELOPMENT

Not Applicable.

BACKGROUND OF THE INVENTION

As background, in the remote sensing/aerial imaging industry, imagery is used to capture views of a geographic area and to be able to measure objects and structures within the images as well as to be able to determine geographic locations of points within the image. These are generally referred to as "geo-referenced images" and come in two basic categories:

Captured Imagery—these images have the appearance they were captured by the camera or sensor employed.

Projected Imagery—these images have been processed and converted such that they confirm to a mathematical projection.

All imagery starts as captured imagery, but as most software cannot geo-reference captured imagery, that imagery is then reprocessed to create the projected imagery. The most common form of projected imagery is the ortho-rectified image. This process aligns the image to an orthogonal or rectilinear grid (composed of rectangles). The input image used to create an ortho-rectified image is a nadir image—that is, an image captured with the camera pointing straight down. It is often quite desirable to combine multiple images into a larger composite image such that the image covers a larger geographic area on the ground. The most common form of this composite image is the "ortho-mosaic image" which is an image created from a series of overlapping or adjacent nadir images that are mathematically combined into a single ortho-rectified image.

When creating an ortho-mosaic, this same ortho-rectification process is used, however, instead of using only a single input nadir image, a collection of overlapping or adjacent nadir images are used and they are combined to form a single composite ortho-rectified image known as an ortho-mosaic. In general, the ortho-mosaic process entails the following steps:

A rectilinear grid is created, which results in an ortho-mosaic image where every grid pixel covers the same amount of area on the ground.

The location of each grid pixel is determined from the mathematical definition of the grid. Generally, this means the grid is given an X and Y starting or origin location and an X and Y size for the grid pixels. Thus, the location of any pixel is simply the origin location plus the number of pixels times the size of each pixel. In mathematical terms: Xpixel=Xorigin+Xsize×Columnpixel and Ypixel=Yorigin+Ysize×Rowpixel.

The available nadir images are checked to see if they cover the same point on the ground as the grid pixel being filled. If so, a mathematical formula is used to determine where that point on the ground projects up onto the camera's pixel image map and that resulting pixel value is then transferred to the grid pixel.

Because the rectilinear grids used for the ortho-mosaic are generally the same grids used for creating maps, the ortho-mosaic images bear a striking similarity to maps and as such, are generally very easy to use from a direction and orientation standpoint.

In producing the geo-referenced aerial images, hardware and software systems designed for georeferencing airborne sensor data exist. For example, a method and apparatus for mapping and measuring land is described in U.S. Pat. No. 5,247,356. In addition, a system produced by Applanix Corporation of Richmond Hill, Ontario, Canada and sold under the trademark "POS AV" provides a hardware and software system for directly georeferencing sensor data. Direct Georeferencing is the direct measurement of sensor position and orientation (also known as the exterior orientation parameters), without the need for additional ground information over the project area. These parameters allow data from the airborne sensor to be georeferenced to the Earth or local mapping frame. Examples of airborne sensors include: aerial cameras (digital or film-based), multi-spectral or hyper-spectral scanners, SAR, or LIDAR.

The POS AV system was mounted on a moving platform, such as an airplane, such that the airborne sensor was pointed toward the Earth. The positioning system received position signals from a satellite constellation and also received time signals from an accurate clock. The sensor was controlled by a computer running flight management software to take images. Signals indicative of the taking of an image were sent from the sensor to the positioning system to record the time and position where the image was taken.

When capturing images with a digital sensor, a variety of abnormalities such as elevated sensor noise levels, streaks, blooms or smears can be formed within the captured image. Such abnormalities can be caused by malfunctions of the image capture device, or by the external environment. For example, in aerial photography, in particular, reflections of the sun off of shiny or reflective surfaces such as lakes, windows, greenhouses or windshields can cause blooms which smear to form streaks in the captured image. An exemplary photograph having a streak formed from reflections off of water is shown in FIG. 15. When a streak is captured in an image, the image capture device's sensor is usually over-stimulated near the location of the streak or hot spot. This typically ruins a part of the image and causes the manual rescheduling at a later time/date of another image of the same area to be taken. Because the abnormality is not detected until after the airplane has landed and the images are processed, the re-taking of another image of the same area typically results in time delays and costly re-flights.

Therefore, there is a need to eliminate the time delays and costly re-flights associated with abnormalities occurring in captured aerial imagery. It is to such a system for eliminating the time delays and costly re-flights that the present invention is directed.

DETAILED DESCRIPTION OF THE INVENTION

Figure 1:
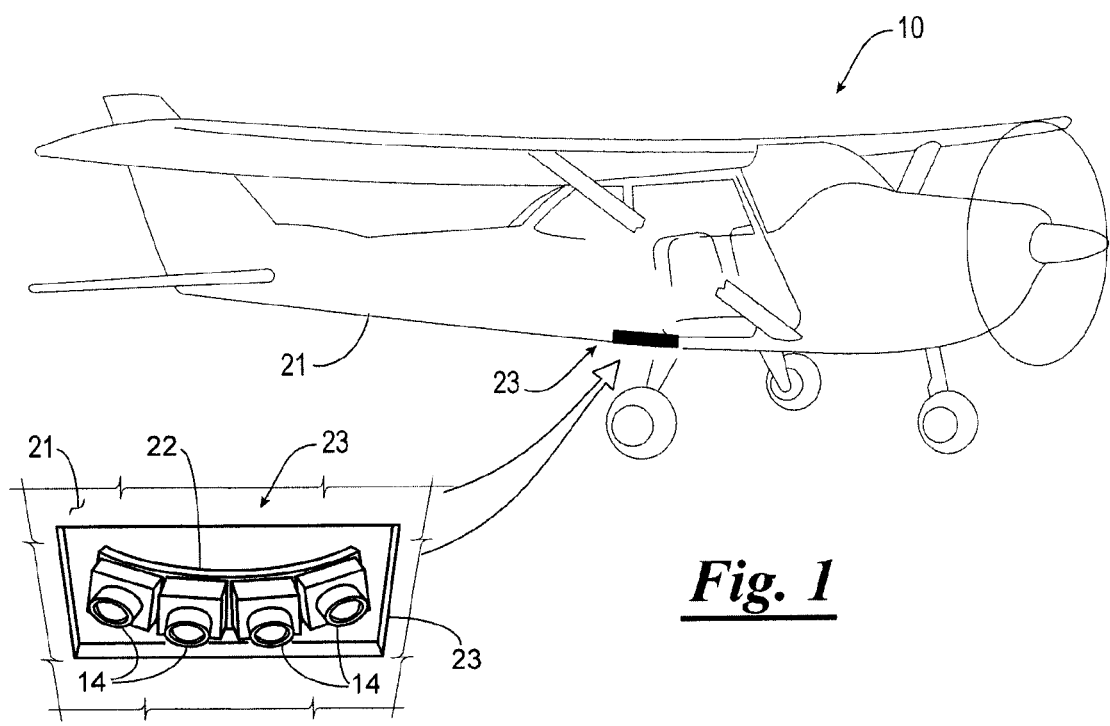
FIG. 1 is a perspective view of an exemplary image capture system constructed in accordance with the present invention.

Before explaining at least one embodiment of the invention in detail, it is to be understood that the invention is not limited in its application to the details of construction, experiments, exemplary data, and/or the arrangement of the components set forth in the following description or illustrated in the drawings. The invention is capable of other embodiments or being practiced or carried out in various ways. Also, it is to be understood that the phraseology and terminology employed herein is for purposes of description and should not be regarded as limiting.

Figure 2:
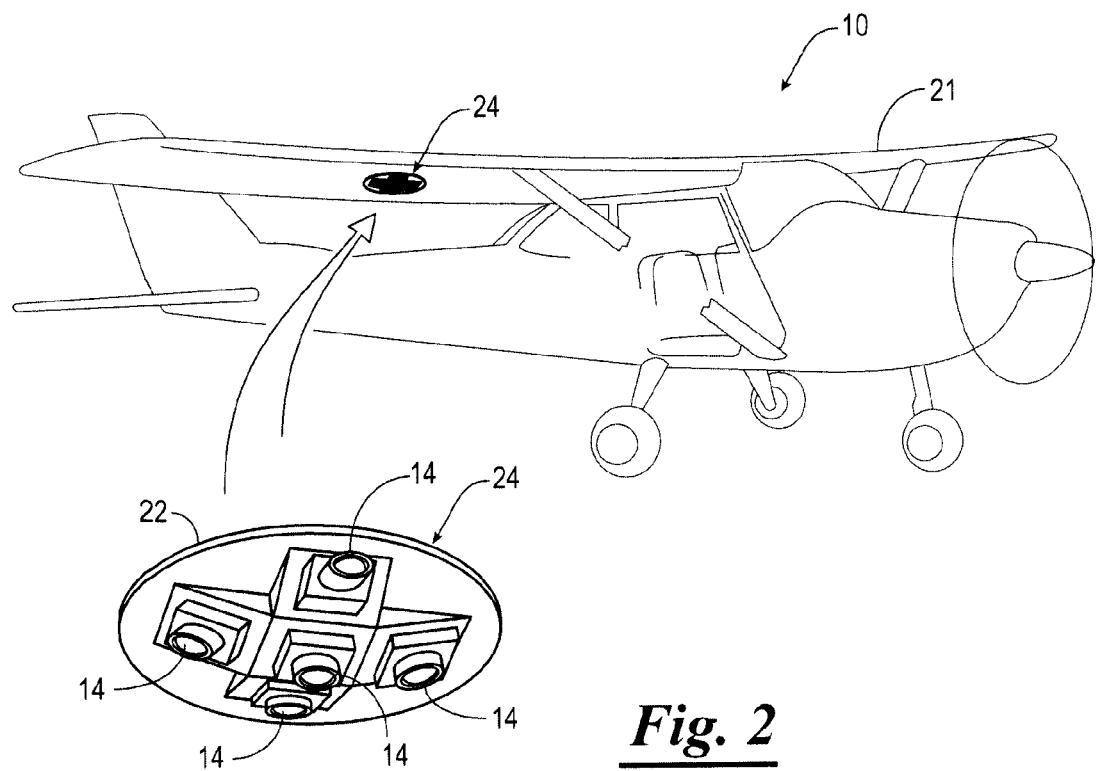
FIG. 2 is a perspective view of another example of an image capture system constructed in accordance with the present invention.
Figure 3:
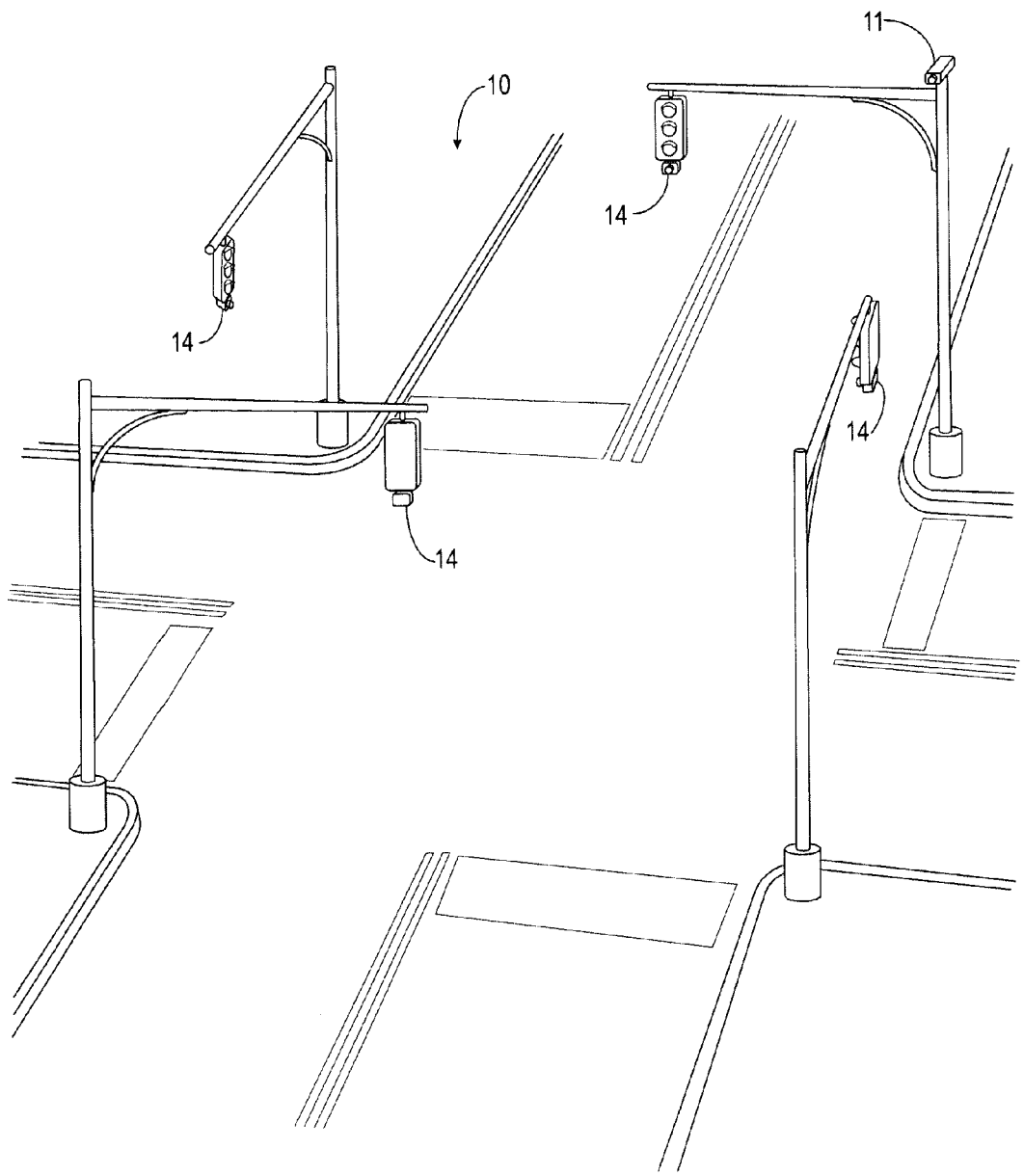
FIG. 3 is a perspective view of yet another example of an image capture system constructed in accordance with the present invention.

Referring to the drawings, and in particular to FIGS. 1, 2 and 3, shown therein and designated by a reference numeral 10 is an image capture system constructed in accordance with the present invention. The image capture system 10 is typically used for capturing aerial images as shown in FIGS. 1 and 2. However, while the image capture system 10 is extremely useful for aerial imaging, it has numerous other applications—such as when a system has more external triggers than inputs on a device that must react to the external triggers. For instance, as shown in FIG. 3, a municipality might have an intersection with a high occurrence of speeding. In this case, the municipality might wish to install a speed monitoring device, such as a radar gun, combined with multiple independently controlled image capture devices 14 to precisely link the time of image capture to the time of radar reading.

The images can be oblique images, orthogonal images, or nadir images, or combinations thereof.

Figure 4:
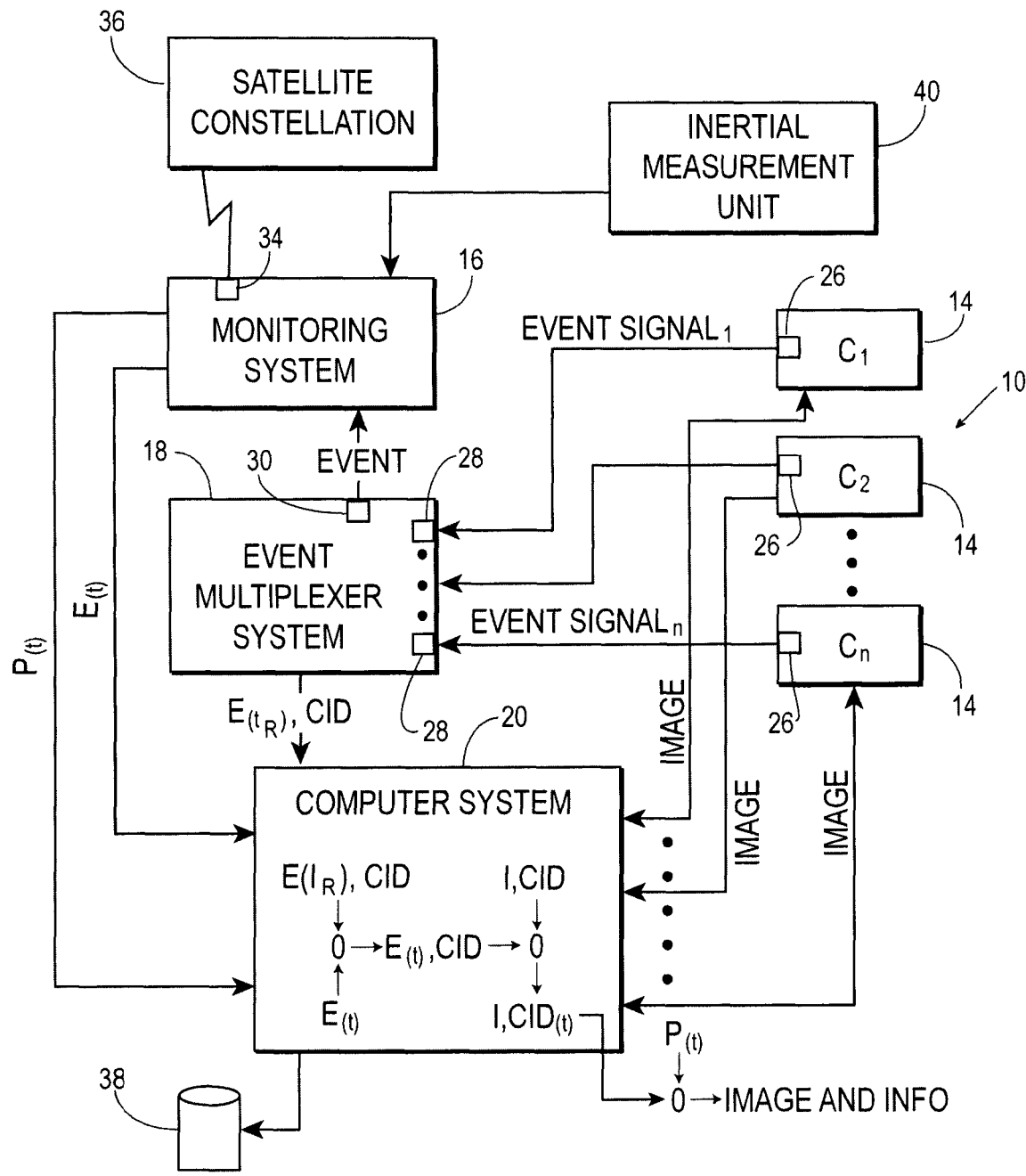
FIG. 4 is a block diagram of the image capture system depicted in FIG. 1.
Figure 5:
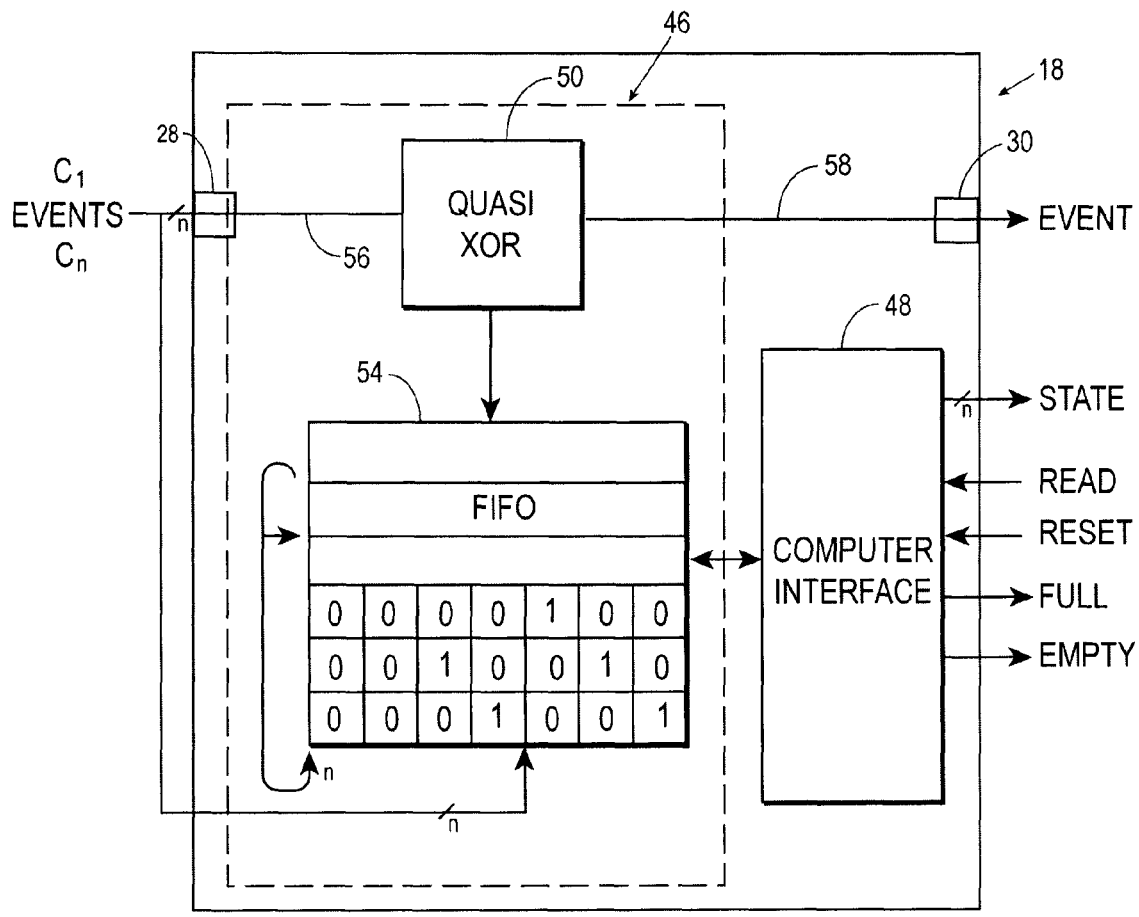
FIG. 5 is a block diagram of one version of an event multiplexer system constructed in accordance with the present invention.
Figure 6:
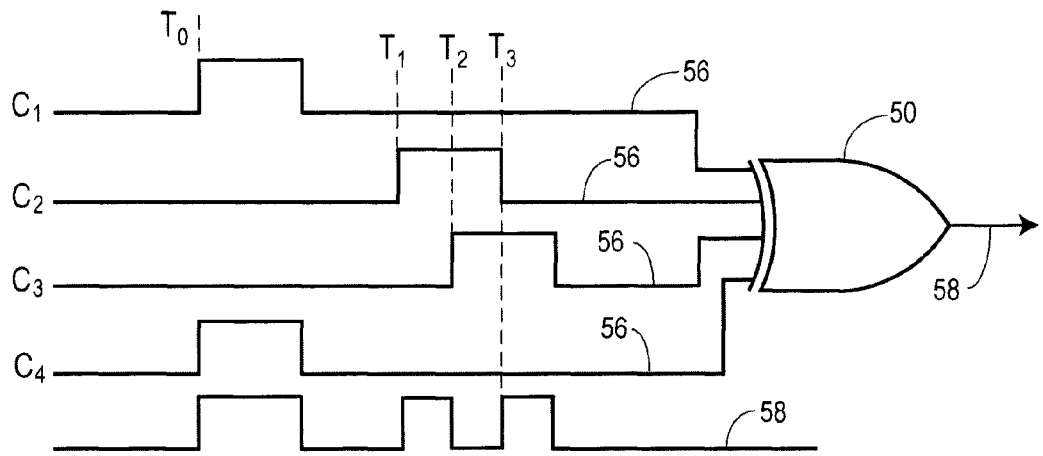
FIG. 6 is a diagrammatic view of a timing/logic flow of an event multiplexer constructed in accordance with the present invention.
Figure 7:
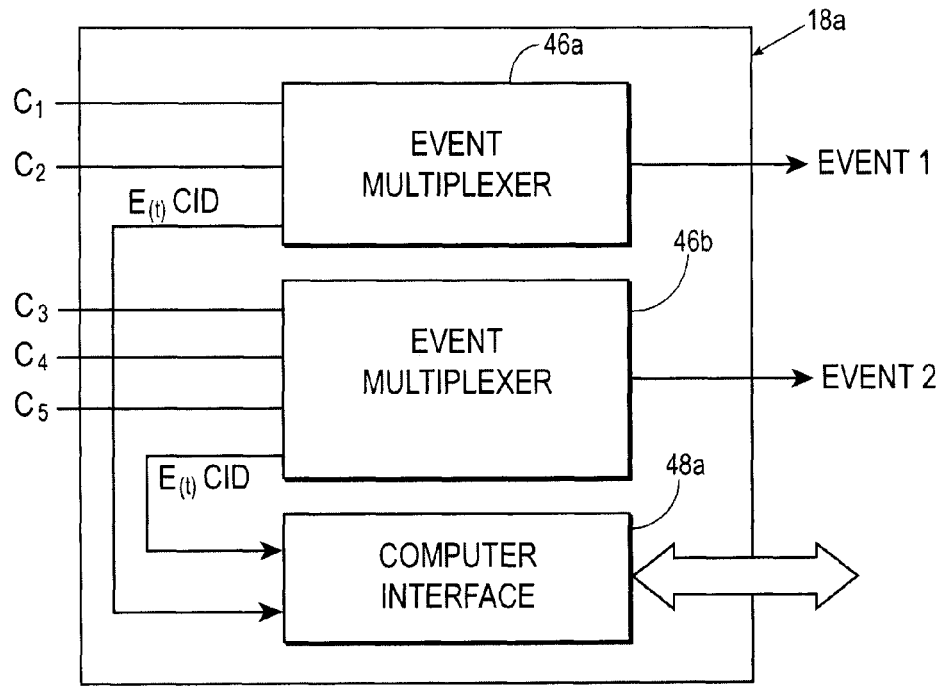
FIG. 7 is a block diagram of another version of an event multiplexer system constructed in accordance with the present invention.
Figure 8:
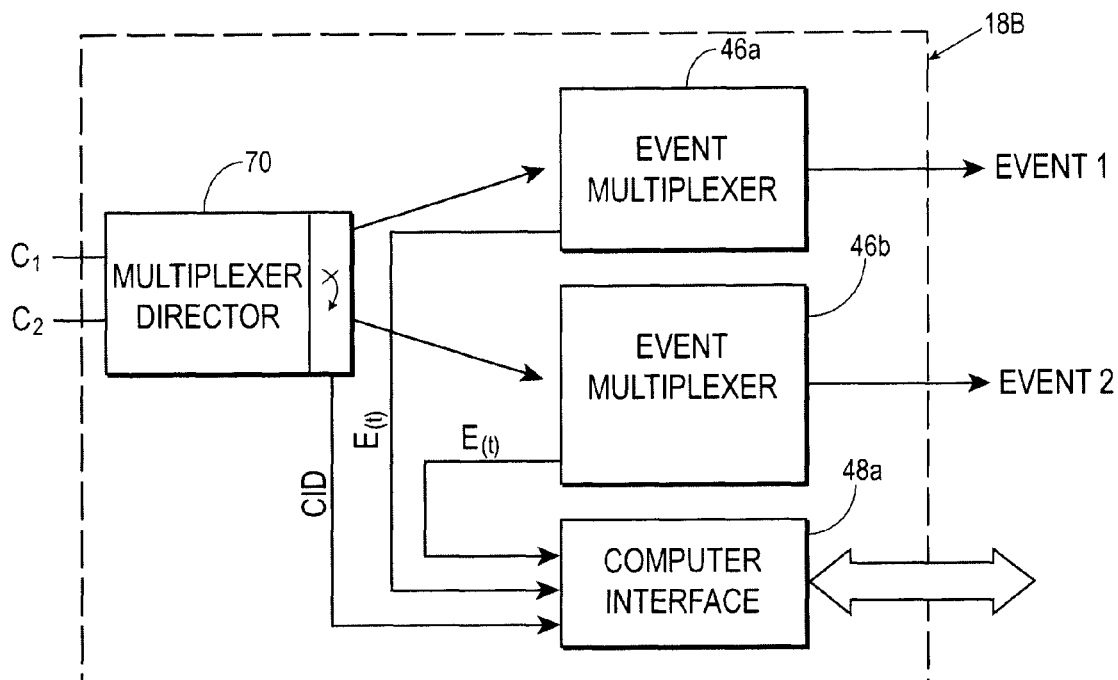
FIG. 8 is a block diagram of yet another version of an event multiplexer system constructed in accordance with the present invention.
Figure 9:
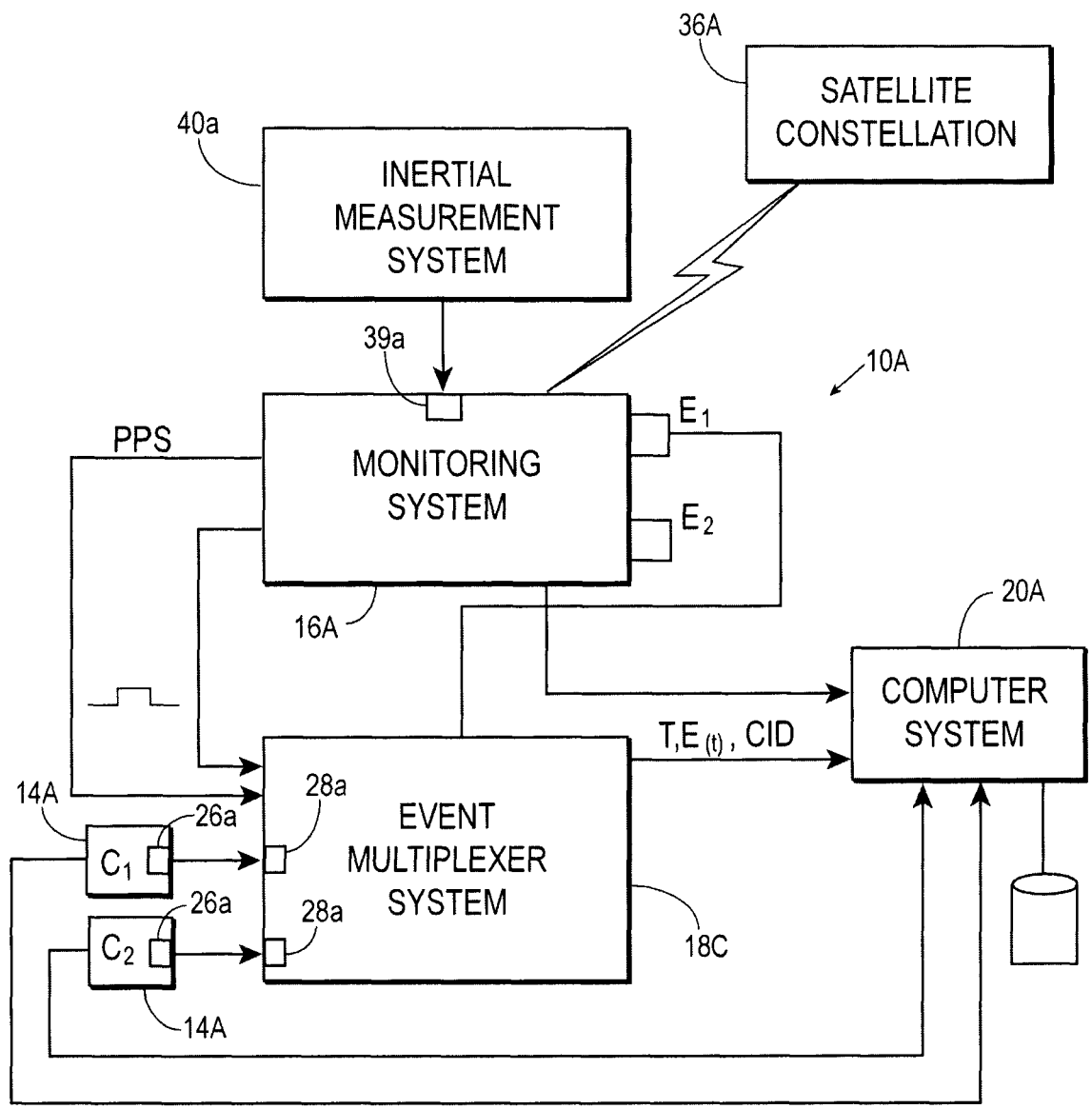
FIG. 9 is a block diagram of another version of an image capture system constructed in accordance with the present invention.

As shown in FIG. 4, the image capture system 10 is provided with, one or more image capture devices 14, optionally one or more monitoring systems 16, optionally one or more event multiplexer systems 18, and one or more data storage units or computer systems 20. The event multiplexer system(s) 18 can be made and used as disclosed in FIGS. 5-9 and paragraphs [0037], [0042]-[0058] of the provisional patent application identified by U.S. Ser. No. 60/926,985 and which is incorporated by reference herein. In the examples depicted in FIGS. 1-3, the image capture system 10 is provided with four image capture devices 14 mounted in a sweep pattern (FIG. 1); five image capture devices 14 mounted in a 360 pattern having image capture devices 14 pointing fore, aft, port, starboard and straight down (FIG. 2); four image capture devices 14 mounted in separate directions generally aligned with respective parts of streets (FIG. 3).

In certain embodiments depicted in FIGS. 1 and 2, the image capture devices 14, the one or more monitoring systems 16, the one or more event multiplexer systems 18 and the computer system 20 are mounted to a moving platform 21. The moving platform 21 or 102 (shown in FIG. 10) can be any type of device or system that can move through space in a predetermined, or random manner. Typically, the moving platform 21 is a manned airplane, but it should be understood that the moving platform 21 can be implemented in other manners. For example, the moving platform 21 can be implemented as an unmanned airplane, a train, an automobile such as a van, a boat, a four wheeler, a motor cycle, tractor, a robotic device or the like.

The image capture devices 14 are mounted to the moving platform 21, and once mounted are typically calibrated so that the exact position and orientation of the image capture devices 14 are known with respect to at least a portion of the moving platform 21. For example, as shown in FIGS. 1 and 2, the image capture devices 14 can be mounted onto a common substrate 22 and calibrated with respect to the substrate 22. It should be noted that all of the cables, wires or other signal paths connecting the image capture devices 14, monitoring system 16, event multiplexer 18 and computer system 20 are not shown in FIGS. 1-3 for purposes of clarity. The substrate 22 having the image capture devices 14 mounted thereto is then mounted to the moving platform 21. In the embodiment depicted in FIG. 1, the image capture devices 14 are mounted internally to the moving platform 21 and the moving platform 21 has one or more opening 23 for the image capture devices 14 to sense data through. In other embodiments, one or more of the image capture devices 14 can be mounted externally to the moving platform 21. For example, in FIG. 2 the image capture devices 14 are mounted to an under-wing pod.

Each of the image capture devices 14 has a sensor (e.g., FIG. 14) for capturing sensor data, such as an image. Each of the image capture devices 14 is also provided with an event channel 26 providing an event signal indicating the capturing of an image by the sensor. The event channel 26 can be any device that provides a signal coincident with the capturing of the image, such as a flash output. The sensor can capture the image in an analog manner, digital manner, or on film. Further, it should be understood that the image can be stored electronically, optically, or provided on a film-based medium.

The monitoring system 16 records data indicative of the capturing of the images. For example, the monitoring system 16 can record position data as a function of time, time data and/or orientation data. In the embodiments depicted in FIGS. 1 and 2, the monitoring system 16 records position data as a function of time, as well as time data and/or orientation data related to the moving platform 21. In the embodiment depicted in FIG. 3, the monitoring system 16 records time data. Preferably, the monitoring system 16 automatically and continuously reads and/or records the data. However, it should be understood that the monitoring system 16 can read and/or record the data in other manners, such as on a periodic basis, or upon receipt of a signal to actuate the monitoring system 16 to obtain and record the data. For example, the event signals produced by the event multiplexer system 18 can be provided to the monitoring system 16 to cause the monitoring system 16 to read and/or record the data indicative of position as a function of time related to the moving platform 21.

In the embodiments depicted in FIGS. 1 and 2, the monitoring system 16 also includes a satellite receiver 34 typically receiving position and timing signals from a satellite constellation 36, using any appropriate protocol, such as GPS or loran, although other types of position determining systems can be used, such as Wireless Application Protocol (WAP).

The computer system 20 receives and stores (preferably in the database 38) the information indicative of the order of events indicated by the event signals, and identification of image capture devices 14 providing the event signals. The computer system 20 optionally also receives and stores the images (preferably in the database 38) generated by the image capture devices 14. The monitoring system 16 records the data indicative of the capturing of images by storing it internally, outputting it to the computer system 20, or outputting such data in any other suitable manner, such as storing such data on an external magnetic or optical storage system. The position related to the moving platform 21 can be provided in any suitable coordinate system, such as an X, Y, Z coordinate system.

Further, the image capture system 10 can be provided with an orientation system, such as an inertial measurement unit 40 for capturing other types of information with respect to the moving platform 21, such as the orientation of the moving platform 21. The inertial measurement unit 40 can be provided with a variety of sensors, such as accelerometers (not shown) for determining the roll, pitch and yaw related to the moving platform 21. Further, it should be understood that the position and/or orientation information does not necessarily have to be a position and/or orientation of the moving platform 21. The position and orientation information is simply related to the moving platform 21, i.e. the position and/or orientation of the moving platform 21 should be able to be determined by the information recorded by the monitoring system 16. For example, the position and orientation information can be provided for a device connected to the moving platform 21. Then, the position and orientation for each image capture device can be determined based upon their known locations relative to the moving platform 21.

In using the systems depicted in FIGS. 1 and 2, the image capture devices 14 or 14a are mounted on the moving platform 21, such as an airplane, such that image capture devices 14 or 14a are pointed toward an object, such as the Earth. The moving platform 21 is then actuated to move, and the image capture devices 14 or 14a capture images at pre-determined or random times or positions. Typically, the image capture devices 14 or 14a will be independently controlled by flight management software running on the computer system 20 or 20a and the taking of the images will be pre-determined. In any event, as the image capture devices 14 or 14a capture the images, signals are passed to the event multiplexers system 18 and the order of events (relative or absolute), image capture device identification and the position as a function of time data is logged and stored by the cooperation of the event multiplexer system(s) 18, monitoring system(s) 16 or 16a (shown in FIG. 9 of the provisional patent application identified by U.S. Ser. No. 60/926,985) and computer systems 20 or 20a (shown in FIG. 9 of the provisional patent application identified by U.S. Ser. No. 60/926,985) as described above. Then, the images are geo-referenced as described in the Background of the Invention section above utilizing the recorded data regarding the order of events (relative or absolute), image capture device identification and the position as a function of time data.

In using the system depicted in FIG. 3, the image capture devices 14 or 14a are mounted adjacent to the intersection. For example, the image capture devices 14 or 14a can be mounted to separate traffic light poles such that the image capture devices 14 or 14a are pointed at the streets entering or leaving the intersection. The system depicted in FIG. 3 also includes a radar gun pointing at the intersection to sense the speed of cars moving through the intersection. When a car speeds through the intersection, one or more of the image capture devices 14 or 14a can be actuated (preferably by a computer controlled management system) to preferably take a picture of the driver and tag of the car, while the event multiplexer system(s) 18 capture data such as time data correlated with the data produced by the radar gun. This precisely links the time of image capture to the time of radar reading to provide evidence of the identity of the speeding car and driver.

Figure 10:
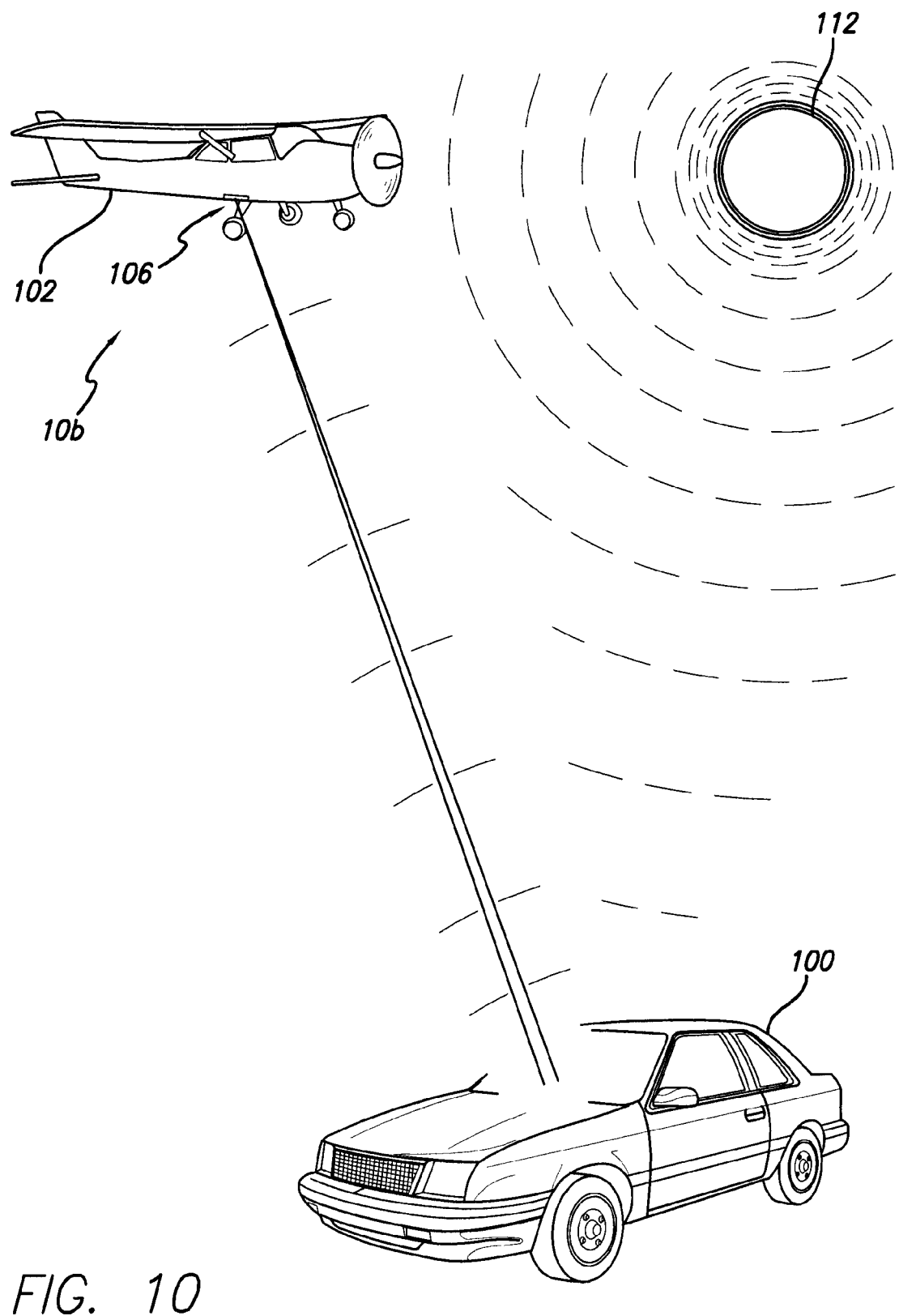
FIG. 10 is a perspective view illustrating the capturing of an image having an abnormality obscuring a portion of the image.
Figure 11:
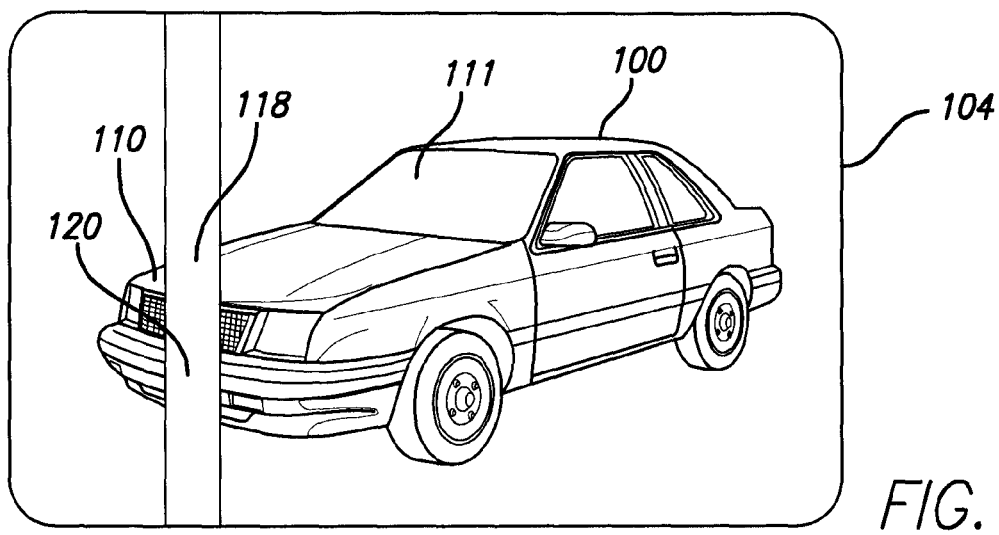
FIG. 11 illustrates a first image having the abnormality obscuring a first portion of the first image.
Figure 12:
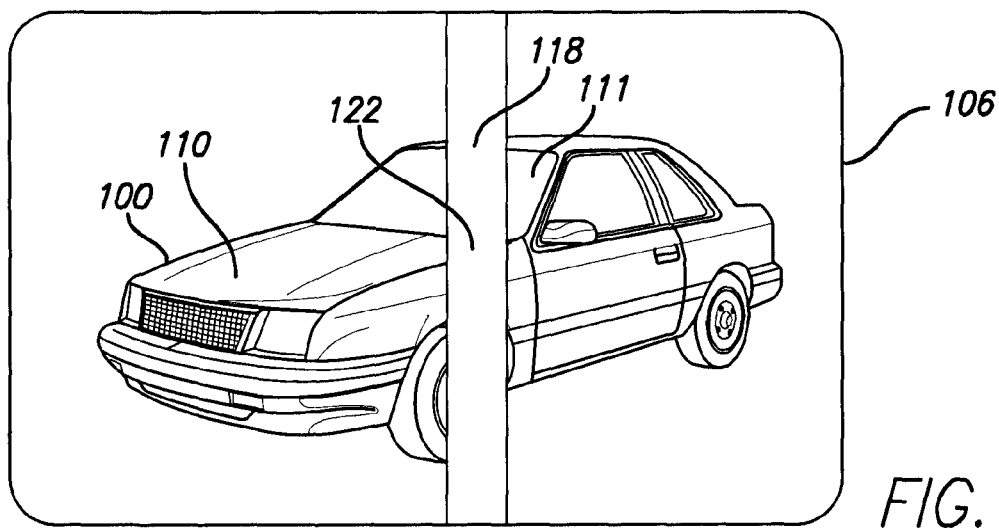
FIG. 12 illustrates a second image, taken shortly after the first image, and having the abnormality obscuring a second portion of a second image.
Figure 13:
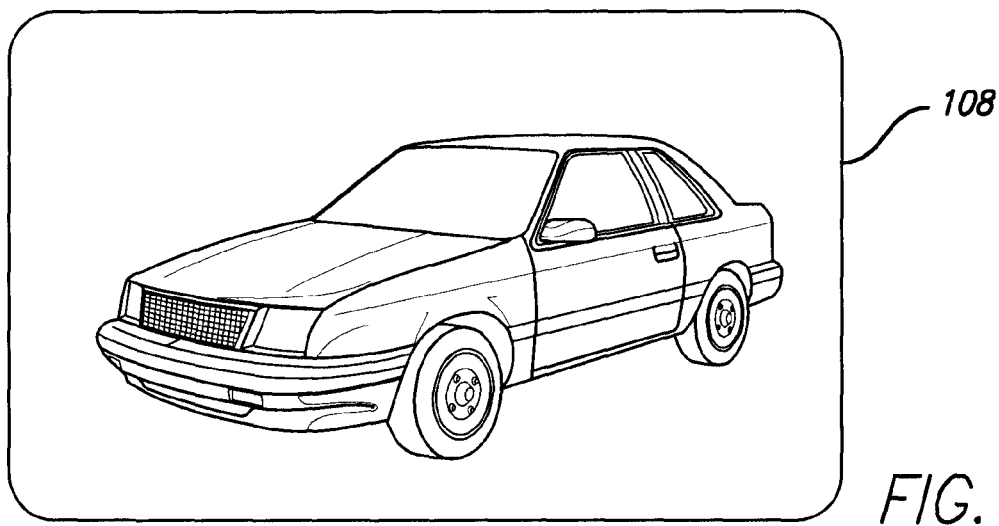
FIG. 13 illustrates a third image based upon the first image and having pixels from the second image used to fill in the portion of the first image obscured by the abnormality.

Referring now to FIGS. 10-12, shown therein is a perspective view illustrating the capturing of an aerial image of one or more objects 100 (shown by way of example as an automobile) by an image capture system 10b mounted to a moving platform 102 such as an airplane or van, as well as first, and second overlapping images 104, 106 of the automobile captured by the image capture system 10b. Shown in FIG. 13 is a third image 108 formed as a combination of the first and second images 104 and 106 as will be described below.

The image capture system 10b is similar in construction and function to the image capture system 10 or 10a described above, with the exception that the image capture system 10b includes one or more detection computer(s) executing an abnormality detection algorithm for detecting abnormalities immediately after an image is captured and then automatically and immediately causing a re-shoot of the image upon detection of an abnormality.

In the example shown in FIG. 10, the image capture system 10b is capturing the first image 104 of the automobile 100. In this case, the automobile 100 has a reflective surface, i.e., a windshield 110 which causes a bright reflection of light from the sun 112 through the lens and onto a sensor 114 (FIG. 14) of one of the image capture devices 14 or 14a. The bright reflection of light causes an abnormality 118, e.g., a hot spot or streak in the first image 104 obscuring a portion of the first image 104 that would have been captured in the absence of the bright reflection of light. The streak is usually caused by bloom and smearing inherent to the digital sensor or rapid movement of the object. Other examples of reflective surfaces encountered in aerial photography include windows, greenhouses, swamps, sand, and bodies of water, such as ponds, lakes, rivers and streams.

FIG. 11 illustrates the first image 104 having the abnormality 118 obscuring a first portion 120 of the first image 104. FIG. 12 illustrates the second image 106, taken shortly (e.g., commonly in the range of about 5-1000 ms) after the first image 104 with the image capture device 14 or 14a in a different location due to the movement of the image capture device 14 or 14a, and having the abnormality 118 obscuring a second portion 122 of the second image 106. The delay between the taking of the first and second images can be a function of the size and/or type of the abnormality. For example, assuming that the abnormality is a streak, the width of the streak can be measured and the delay set so that the second image 106 will permit the portion of the object obscured by the streak to be captured.

FIG. 13 illustrates the third image 108 produced as an optional feature of the present invention. The third image 108 is formed from a combination of the first and second images 104 and 106. The third image 108 includes pixels from the first image 104 or the second image 106 which were not obscured by the abnormality. Pixels from the first or second image 104 or 106 are added to the third image 108 to fill in the portion of the first or second image 104 or 106 obscured by the abnormality 118. In one embodiment, the third image 108 is formed after the airplane has landed and the first and second images 104 and 106 have been processed.

Figure 14:
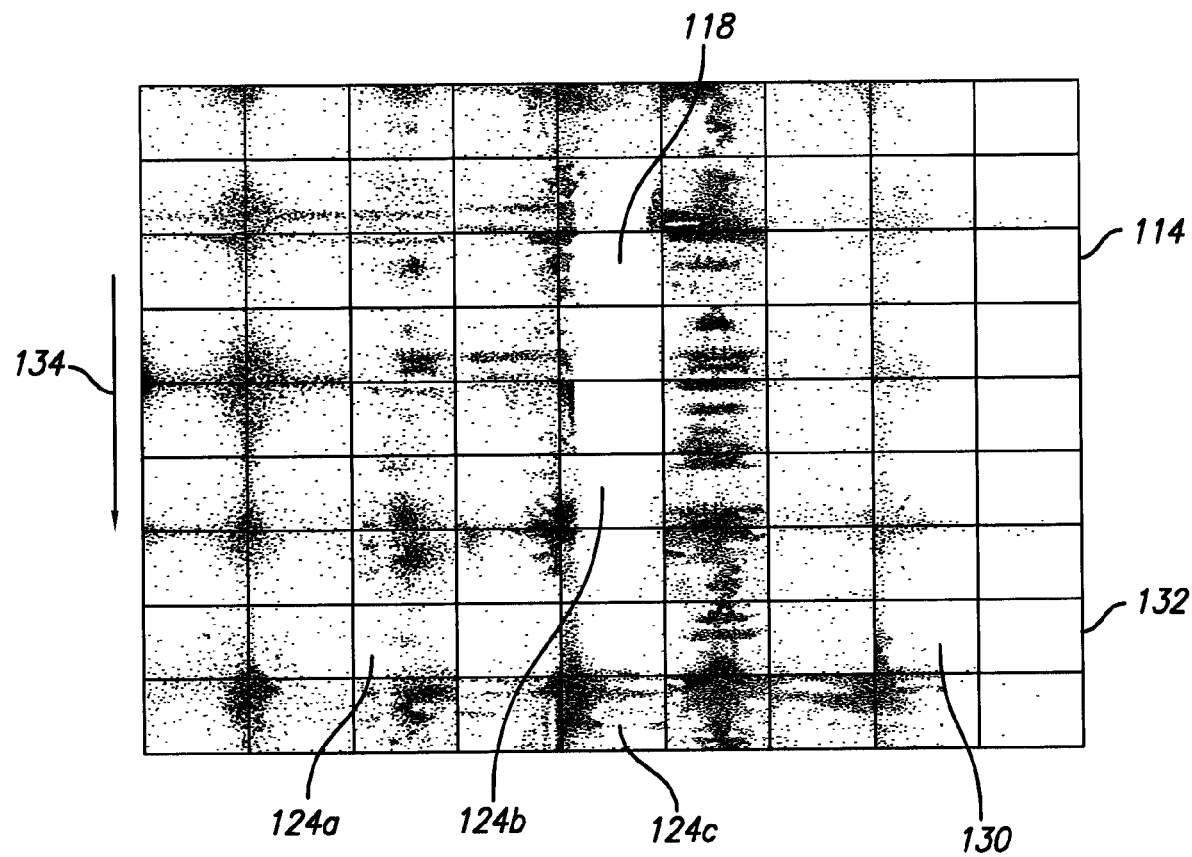
FIG. 14 is a diagrammatic view of an exemplary image capture device's sensor.

To aid the detection of abnormalities, the image capture system 10b preferably utilizes digital cameras with each digital camera having one or more sensor 114. A diagrammatic view of the sensor 114 is shown in FIG. 14. The sensor typically contains millions of photosensitive solid state devices, such as diodes, charge coupled devices or transistors, called photosites 124. Only 81 photosites are shown in FIG. 14 for purposes of clarity. Three of the photosites are labeled with the reference numerals 124a, 124b and 124c for purposes of clarity. When an image is being captured, each photosite records the intensity or brightness of the light that falls on it by accumulating a charge; i.e., the more light the higher the charge. The brightness recorded by each photosite is then stored as a set of numbers that can then be used to set the color and brightness of pixels in the image.

The sensor 114 has an image area 130 and a dark area 132 bordering the image area 130. The dark area 132 can serve as a reference to the image area 130. The dark area 132 may be referred to herein as a "reference area". The image area 130 is shown in light gray, and the dark area 132 is shown in darker gray. The photosites 124a and 124b are located in the image area 130 while the photosite 124c is located in the dark area 132. The sensor 114 can be configured as an area array sensor with photosites arranged in a grid pattern covering the entire image area 130 and at least part of the dark area 132. When the image is read from the sensor 114, the stored electrons are converted to a series of analog charges which are then converted to digital values by an Analog-to-Digital (A to D) converter (not shown).

Once the sensor 114 has captured the image, it must be read, converted to digital, and then stored. The image can be stored and logged in the manner described above. The charges stored on the sensor 114 are typically not read all at once but a row, pixel or column at a time. When a row or column is read at a time, pixel values in each row or column are read in a sequential manner by moving the pixel values up or down the row or column through the dark area 132 of the sensor 114 as indicated by an arrow 134.

To detect an abnormality, the abnormality detection algorithm scans the image utilizing predetermined parameters indicative of characteristics of abnormalities. One method to locate certain types of abnormalities, is to monitor the pixel values (or an average of the pixel values) in the dark area 132 as the pixel values are being moved through the dark area 132. Another method is to scan/analyze the image using pattern recognition techniques to locate one or more abnormality. For example, the image can be scanned/analyzed after it has been moved through the dark area 132 and stored in memory.

Figure 15:
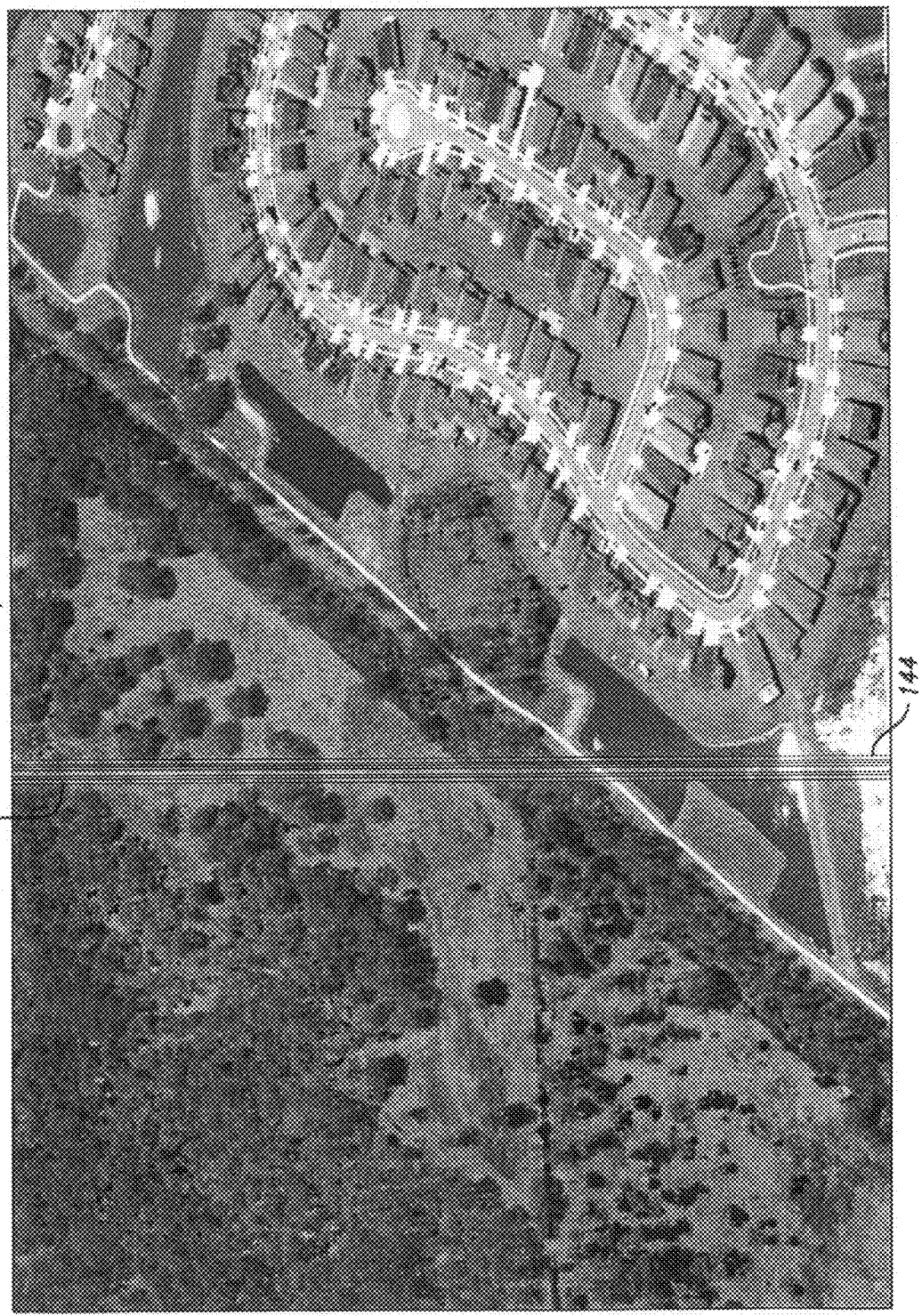
FIG. 15 is an exemplary aerial photograph having a streak formed from reflections of the sun off of water.

As an example, shown in FIG. 14 is an abnormality 118, i.e., a streak exposed to the photosites 124 in a column containing photosites 124b and 124c. During scanning, when the data in the column having the photosites 124b and 124c is moved in the direction 134, an elevated value in the photosite 124c can be detected. As a further example, FIG. 15 is an exemplary aerial photograph 140 having a streak 142 formed from reflections of the sun off of water 144.

When the pixel values exceed a predetermined or dynamic threshold value indicative of a streak or hot spot, then the abnormality detection algorithm causes the detection computer to output a signal causing one or more immediate re-shoot(s) of the image. The term "immediate" as used herein means occurring, acting, or accomplished without substantial loss or interval of time. The interval of time between the capturing of the first and second images 104 and 106 may depend upon a variety of factors, such as the time involved in detecting the abnormality, the size or type of the abnormality, and the time involved in actuating the image capture device 14 or 14a to capture the second image 106.

To capture the portion of the object originally scheduled to be captured, the abnormality detection algorithm can cause one or more re-shoots without detecting whether the abnormality is captured in the re-shot images, or the abnormality detection algorithm can scan each re-shot image and cause another re-shoot until the earlier of (1) a re-shot image not containing an abnormality, or (2) the next scheduled image to be taken by the image capture device 14 or 14a.

Alternatively, the abnormality detection algorithm can flag an image as "bad" and cause the detection computer to send a signal to the flight management software executed on the computer systems 20 or 20a to automatically schedule a re-shoot for a future time. Preferably, the detection computer schedules a re-shoot of the image such that the image is retaken before landing of the airplane.

It should be understood that certain of the processes described above, such as the formation of the third image 108, can be performed with the aid of a computer system running image processing software adapted to perform the functions described above. Further, the first, second and third images and data, as well as the abnormality detection algorithm are stored on one or more computer readable mediums. Examples of a computer readable medium include an optical storage device, a magnetic storage device, an electronic storage device or the like. The term "Computer System" as used herein means a system or systems that are able to embody and/or execute the logic of the processes, such as the abnormality detection algorithm, described herein. The logic embodied in the form of software instructions or firmware may be executed on any appropriate hardware which may be a dedicated system or systems, or a general purpose computer system, or distributed processing computer system, all of which are well understood in the art, and a detailed description of how to make or use such computers is not deemed necessary herein. The detection computer can be the same physical computer as the computer systems 20 or 20a, or different from the computer systems 20 or 20a. In one embodiment, the image capture system 10b includes a detection computer implemented as a part of one of the image capture devices 14 or 14a. For example, the image capture system 10b can include multiple detection computers with each detection computer implemented as a part of one image capture device 14 or 14a. In this embodiment, each of the one or more detection computers monitors the images being captured by its respective image capture device 14 or 14a and can cause a re-shoot by either passing a signal to the computer systems 20 or 20a, or by passing a signal directly to the image capture device 14 or 14a.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of taking aerial images, comprising the steps of:
  capturing a first image of a portion of the Earth utilizing an image capture device mounted to a moving platform and based upon a schedule accessed by flight management software executed by a computer system;
  immediately detecting an abnormality in the first image; and
  immediately causing a sequence of re-shoots of the first image;
  wherein the step of immediately causing a sequence of re-shoots of the first image is defined further as immediately causing one or more re-shoots without detecting whether the abnormality is captured in the re-shot images.

2. A method of taking aerial images, comprising the steps of:
  capturing a first image of a portion of the Earth utilizing an image capture device mounted to a moving platform and based upon a schedule accessed by flight management software executed by a computer system;
  immediately detecting an abnormality in the first image; and
  immediately causing a sequence of re-shoots of the first image;
  wherein the step of immediately causing a sequence of re-shoots of the first image is defined further as searching for an abnormality in the re-shot images and ending the sequence of re-shoots upon the lack of detection of an abnormality in a re-shot image.

* * * * *